Dec. 7, 1926. D. B. BRADNER Re. 16,495
COMPOSITION FOR PRODUCING LACHRYMATING GASES
PRODUCTION OF LACHRYMATING GASES
Original Filed May 3, 1924
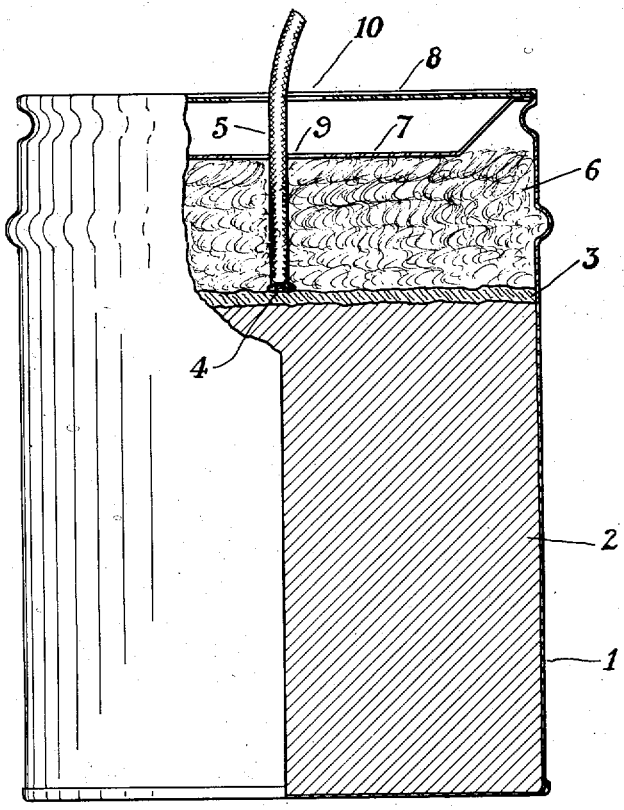
Donald B Bradner
Inventor
By Chas. Silver
Attorney Reissued Dec. 7, 1926.

Re. 16,495

UNITED STATES PATENT OFFICE.

DONALD B. BRADNER, OF HAMILTON, OHIO, ASSIGNOR, BY MESNE ASSIGNMENTS, TO FEDERAL LABORATORIES, INC., OF PITTSBURGH, PENNSYLVANIA, A CORPORATION OF DELAWARE.

PRODUCTION OF LACHRYMATING GASES.

Original No. 1,565,899, dated December 15, 1925. Serial No. 710,736. filed May 3, 1924. Application for reissue filed September 2, 1926. Serial No. 133,286.

This invention relates to the production of effective concentrations of lachrymating gases in non-persistent form.

Among the objects of this invention is the production of a composition by which effective concentrations of lachrymating gases may be produced without wasting a large amount of the lachrymator and without rendering the ground or structures in the vicinity where said lachrymating gases are generated untenable for periods of time beyond which lachrymation is desired.

A further object of this invention is to form a composition of a lachrymating agent such as chloracetophenone, bromacetophenone, iodoacetophenone, etc. with a fuel of the type such as nitrocellulose, nitroglycerine or black powder. These halogen derivatives of acetophenone will produce irritation and lachrymation when persons are exposed thereto for a period of three minutes in concentration much below 0.01 milligram per liter.

A further object of this invention is to produce a composition which is practicable for use by the police in generation of lachrymating gases for dispersing mobs and other unlawful gatherings.

In practicing my invention, I prefer to use chloracetophenone, and I place this in direct contact with a fuel which is capable of burning and liberating a sufficient volume of hot gases to volatilize the chloracetophenone. Preferably, the chloracetophenone and the fuel are intimately mixed. The fuel may be a mixture of some oxidizing and reducing agent, such as ammonium nitrate and charcoal or else a material like nitrocellulose wherein each molecule contains both oxidizing and reducing elements. I may also mix an excess of the lachrymator with an oxidizing agent so that the latter will oxidize a part of the lachrymator and thereby generate sufficient heat to volatilize the remainder of the lachrymator. It is highly desirable to avoid or at least minimize as far as possible the composition of the evolved lachrymator, and in order to accomplish this result I not only thoroughly distribute the fuel throughout the lachrymator but adjust the proportion of lachrymator to fuel so that a sufficient amount of heat will be absorbed by evaporation of the lachrymator to prevent an excessive rise in temperature. Since combustion of such fuels as nitrocellulose and nitroglycerine proceeds readily at comparatively low temperatures, these fuels have been found most satisfactory in practicing my invention.

In using nitrocellulose and chloracetophenone for this purpose, the proportions may vary from 1 to 5 parts of nitrocellulose for 1 part of chloracetophenone.

If a mixture is prepared from chloracetophenone and nitrocellulose and allowed to stand for a time before using, there is a tendency for slow decomposition to develop and in order to overcome or counteract this effect, I stabilize such mixtures by adding thereto an anti-acid such as $CaCO_3$, $MgCO_3$, MgO and ZnO. If MgO is employed as a stabilizer it should preferably vary from about 8 to 12% of the weight of chloracetophenone used in the mixture.

In using my composition, it is placed in a suitable container and suitable means provided for igniting the composition. In the accompanying drawing there is shown a smoke candle which is a specific form of device adapted for use with my composition. This device is shown part in elevation and part in section and consists of a can (1) containing the mixture (2) of chloracetophenone, nitrocellulose and MgO as a stabilizer. Above the mixture (2) is the starter composition (3) which is in contact with the tip (4) of the safety fuse (5). This tip (4) may consist of meal powder which is bound to the fuse with a celluloid-acetone composition. Above the starter (3) is steel wool (6). At the top of the can are the cover discs (7) and (8) provided with openings (9) and (10), respectively, which allow the escape of the exit gases.

In making this candle, the chloracetophenone, nitrocellulose and MgO are thoroughly mixed and tamped into the container. A satisfactory mixture consists of 7 parts of chloracetophenone to 13 parts of nitrocellulose and 1 part of MgO. Acetone is poured uniformly over the top of the mixture in sufficient amount to thoroughly moisten the mixture for a depth of about ½ to 1 inch and the acetone allowed to evaporate, thus producing a hard, compact surface on the mixture. The starter composition is then spread over the top of the mixture, a layer of $\frac{1}{16}$ to $\frac{1}{8}$ inch of starter mixture being sufficient for most purposes. A suitable starter composition for this purpose is a powdery mixture of about equal parts of reduced iron and $KMnO_4$. The steel wool is then placed upon the starter composition and the discs (7) and (8) are then secured to the top of the can. A small opening leading to the starter composition is made in the steel wool and the tipped fuse is positioned as shown in the drawing.

The candle is operated by igniting the fuse (5) which, after a delay, ignites the starter composition, and this in turn ignites the chloracetophenone-nitrocellulose-magnesium oxide mixture. As the nitrocellulose of this mixture burns, the hot gases volatilize the chloracetophenone which becomes entrained with the combustion gases and the gaseous mixture passes out of the openings (9) and (10). Since the chloracetophenone is so disposed within the candle that it is in the combustion zone of the nitrocellulose, it is immediately gasified and an efficient concentration of lachrymating gas is secured. Since nitrocellulose and also nitroglycerine burn under these conditions at temperatures below that at which substantial decomposition of the chloracetophenone takes place, the evolved lachrymating gases will be practically undecomposed as they pass out of the candle.

In the following claims, the term "gas" is used to include substances which are in the gaseous phase as well as substances which are commonly termed smokes, clouds, vapors, mists, etc., and combinations of these.

In my copending application, Serial No. 133,288, filed September 2, 1926, for reissue of my Patent 1,541,103 of June 9, 1925, I have disclosed a gas grenade having two chambers, one for a fuel and the other for a gas-producing substance such as chloracetophenone, the combustion occurring in one chamber and the heated gases of combustion then traveling through the other chamber over the surface of the chloracetophenone.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A composition for producing an effective concentration of a lachrymating gas in non-persistent form, comprising a lachrymating organic compound not readily volatile at ordinary temperatures which lachrymates at a concentration below 0.01 milligram per liter in three minutes and having intimately distributed therethrough a fuel which burns at a temperature sufficient to volatilize said lachrymator but below that at which the lachrymator will decompose within the time required for said volatilization.

2. A composition for producing an effective concentration of a lachrymating gas in non-persistent form, comprising a halogen derivative of acetophenone having intimately distributed therethrough a fuel which burns at a temperature sufficient to volatilize said halogen derivative but below that at which the halogen derivative will decompose within the time required for said volatilization.

3. A composition for producing an effective concentration of a lachrymating gas in non-persistent form, comprising chloracetophenone having intimately distributed therethrough a fuel which burns at a temperature sufficient to volatilize said chloracetophenone but below that at which the chloracetophenone will decompose within the time required for said volatilization.

4. A composition for producing an effective concentration of a lachrymating gas in non-persistent form, comprising a lachrymating halogen derivative of acetophenone having intimately distributed therethrough a fuel comprising a nitrated organic body which burns at a temperature sufficient to volatilize said halogen derivative of acetophenone but below that at which the said halogen derivative of acetophenone will decompose within the time required for said volatilization.

5. A composition for producing an effective concentration of a lachrymating gas in non-persistent form, comprising a lachrymating organic compound not readily volatile at ordinary temperatures and having intimately distributed therethrough a fuel comprising nitrocellulose and nitroglycerine.

6. A composition for producing an effective concentration of a lachrymating gas in non-persistent form, comprising chloracetophenone having intimately distributed therethrough a fuel comprising nitrocellulose.

7. A composition for producing an effective concentration of a lachrymating gas in non-persistent form, comprising an oxidizing agent intimately distributed and associated with an excess of a lachrymating agent which lachrymates at a concentration below 0.01 milligram per liter in three minutes and adapted to enter into combination with said oxidizing agent and yield sufficient heat by such combination to volatilize the remainder of said lachrymator.

8. A composition for producing effective concentration of a lachrymating gas in non-persistent form, comprising an oxidizing agent intimately distributed and associated with an excess of a halogen derivative of acetophenone adapted to enter into combination with the halogen derivative of acetophenone and yield sufficient heat by such combination to volatilize the remainder of said chloracetophenone.

9. A composition for producing an effective concentration of a lachrymating gas in non-persistent form, comprising an oxidizing agent intimately distributed and associated with an excess of chloracetophenone adapted to enter into combination with chloracetophenone and yield sufficient heat by such combination to volatilize the remainder of said chloracetophenone.

10. A composition for producing an effective concentration of a lachrymating gas in non-persistent form, comprising a lachrymating compound which lachrymates at a concentration below 0.01 milligram per liter in three minutes and having intimately distributed therethrough a fuel which burns at a temperature sufficient to volatilize said lachrymator but below that at which the lachrymator will decompose within the time required for said volatilization and an anti-acid for preventing or retarding decomposition of the lachrymator and fuel.

11. A composition for producing an effective concentration of a lachrymating gas in non-persistent form, comprising chloracetophenone having intimately distributed therethrough a fuel which burns at a temperature sufficient to volatilize said chloracetophenone but below that at which the chloracetophenone will decompose within the time required for said volatilization and an anti-acid for preventing or retarding decomposition of the mixture of chloracetophenone and fuel.

12. A composition for producing an effective concentration of a lachrymating gas in non-persistent form, comprising a lachrymating organic compound which lachrymates at a concentration below 0.01 milligram per liter in three minutes and not readily volatile at ordinary temperatures and having intimately distributed therethrough a fuel comprising nitrocellulose and nitroglycerine and an anti-acid for preventing or retarding decomposition of the mixture of lachrymator and fuel.

13. A composition for producing an effective concentration of a gas in non-persistent form, comprising a lachrymating halogen derivative of acetophenone and having intimately distributed therethrough a fuel comprising a nitrated organic body which burns at a temperature sufficient to volatilize said halogen derivative of acetophenone but below that at which the said halogen derivative of acetophenone will decompose within the time required for said volatilization and an anti-acid for preventing or retarding decomposition of the mixture of the halogen derivative of acetophenone and fuel.

14. A composition for producing an effective concentration of a lachrymating gas in non-persistent form, comprising chloracetophenone having intimately distributed therethrough a fuel comprising nitrocellulose and an anti-acid for preventing or retarding decomposition of the mixture of chloracetophone and fuel.

15. For the production of lachrymating gases, a halogen derivative of acetophenone and a fuel which burns at a temperature sufficient to volatilize said halogen derivative but below that at which it will decompose within the time required for volatilization, the halogen derivative being placed in the zone of combustion of the fuel.

16. For the production of an effective concentration of a lachrymating gas, chloracetophenone, and a fuel which burns at a temperature sufficient to volatilize the chloraceto phenone but below that at which the chloracetophenone will decompose within the time required for said volatilization, the chloracetophenone being placed within the combustion zone of the fuel.

17. For the production of an effective concentration of a lachrymating gas, a lachrymating organic compound not readily volatile at ordinary temperatures, and a fuel capable of self-sustaining combustion which burns at a temperature sufficient to vaporize the lachrymating compound but below that at which it will decompose within the time required for such vaporization, the lachrymating compound being within the combustion zone of the fuel so as to be directly exposed to the flame thereof.

18. For the production of an effective concentration of a lachrymating gas, chloracetophenone, and a fuel comprising nitrocellulose, the chloracetophenone being placed within the combustion zone of the fuel.

19. For the production of an effective concentration of a lachrymating gas, a vaporizable lachrymator and a nitrocellulose fuel, the lachrymator being within the combustion zone of the nitrocellulose fuel so as to be directly exposed to the flame thereof.

In testimony whereof I have hereunto set my hand.

DONALD B. BRADNER.

Certificate of Correction.

Reissue Patent No. 16,495, granted December 7, 1926, to

DONALD B. BRADNER.

It is hereby certified that error appears in the printed specification of the above-mentioned patent requiring correction as follows: Page 1, line 47, for the words "the composition" read *decomposition;* and that the said Letters Patent should be read with this correction therein that the same may conform to the record of the case in the Patent Office.

Signed and sealed this 22d day of February, A. D. 1927.

[SEAL.]

M. J. MOORE,
*Acting Commissioner of Patents.*